United States Patent [19]

Moreau et al.

[11] 4,188,166
[45] Feb. 12, 1980

[54] SMALL SIZE TELEMANIPULATOR

[75] Inventors: Claude Moreau, Nantes; René Schreder, St. Herblain, both of France

[73] Assignee: Ateliers et Chantiers de Bretagne-A.C.B., Nantes, France

[21] Appl. No.: 798,478

[22] Filed: May 19, 1977

[30] Foreign Application Priority Data

May 24, 1976 [FR] France .................... 76 15701

[51] Int. Cl.² .............................................. B25J 3/00
[52] U.S. Cl. ................................. 414/735; 3/12.3; 3/12.5; 414/4; 414/739; 414/744
[58] Field of Search .............. 214/1 R, 1 CM, 1 BC, 214/1 BH, DIG. 10, 1 BD, 1 BV; 3/12, 12.1, 12.2, 12.3, 12.4

[56] References Cited

U.S. PATENT DOCUMENTS

| | | | |
|---|---|---|---|
| 2,861,701 | 11/1958 | Bergsland et al. | 214/1 CM |
| 3,247,978 | 4/1966 | Neumeier | 214/1 CM |
| 3,272,347 | 9/1966 | Lemelson | 214/1 CM |
| 3,429,457 | 2/1969 | Jennrich et al. | 214/1 CM |
| 3,610,438 | 10/1971 | Opdahl | 214/1 CM |

FOREIGN PATENT DOCUMENTS

| | | | |
|---|---|---|---|
| 1459250 | 10/1966 | France . | |
| 1508128 | 11/1967 | France . | |
| 1500113 | 11/1968 | France . | |
| 1111039 | 4/1968 | United Kingdom . | |
| 146165 | 5/1962 | U.S.S.R. | 214/1 CM |

*Primary Examiner*—Frank E. Werner
*Attorney, Agent, or Firm*—Charles H. Lindrooth

[57] ABSTRACT

A compact telemanipulator arm assembly with a rotatable gripping tool is disclosed that is watertight and has a sleek profile suitable for penetrating into narrow underwater passages of nuclear reactors. The assembly has a plurality of elongated arm elements jointed together end-to-end in series relationship. Bending of adjacent elements is achieved by an axially aligned motor housed within one of the adjacent elements, a screw-nut system that converts the motor shaft rotation to axial movement of a slider, and mechanical linkage that converts the slider movement to relative pivoting of the elements. The gripping tool is mounted on a tool support on an end element. Tool gripping members are operated by a first axially aligned motor housed within the end element and a screw-nut system that converts the first motor shaft rotation to axial movement of a slider. Tool rotation is controlled by a second axially aligned motor housed within the end element and mounted on the slider between the first motor and the tool. A pin is attached to the second motor drive shaft and extends through a central bore of the tool support. The pin has an axial key which travels in a longitudinal groove on the bore. Linear movement of the pin caused by the slider operates the tool gripping members; rotation of the pin caused by the rotating shaft of the second motor rotates the tool. The motors are permanent magnet DC electric brake motors.

9 Claims, 3 Drawing Figures

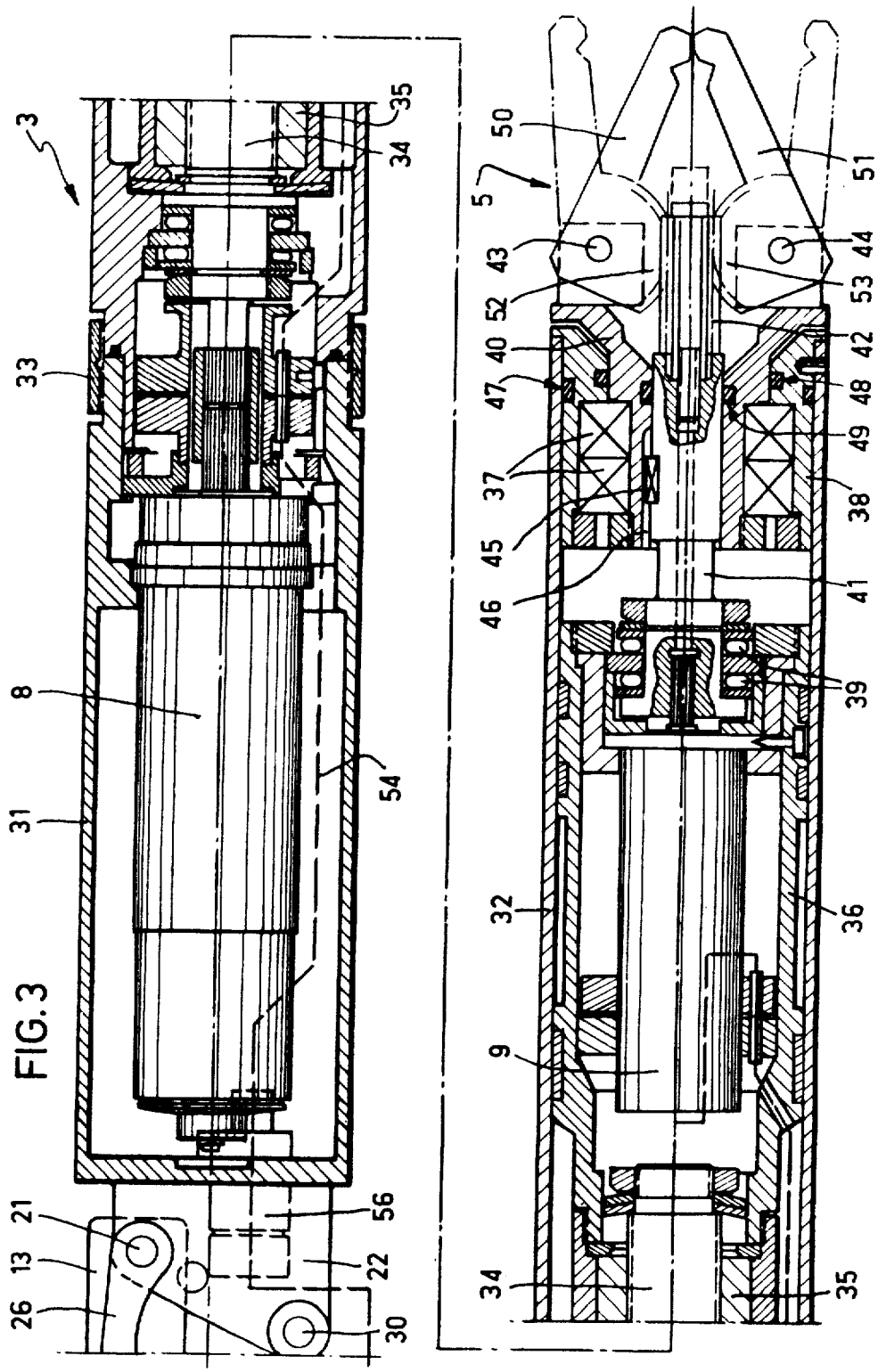

SMALL SIZE TELEMANIPULATOR

BACKGROUND OF THE INVENTION

1. Field of the Invention

The present invention relates to a telemanipulator (or remote handling device) of small bulk.

The invention is of particular application in all fields where it is necessary to work at a distance in a restricted space, such as inside the passages of nuclear reactors where operations are carried out under a protective covering of water.

2. Description of the Prior Art

The supervision and maintenance of nuclear reactors and the equipment surrounding them necessitates the use of manipulators capable of penetrating inside narrow passages and carrying out various operations therein. To be effective, these manipulators must be capable of substantially reproducing the same movements as a human arm and of possessing substantially the same degrees of freedom. Thus, they must be capable of pivoting on themselves around their longitudinal axes, of bending at different pivot points, of orienting their ends and of opening or closing the pincers or tongs with which they are equipped. All these movements being controlled at a distance necessitates the presence of numerous devices which have to be housed inside the articulated elements of the manipulator arm.

One type of known pneumatic or hydraulic manipulator is described in French Pat. No. 1,500,113/92845 which discloses arm elements articulated together by means of ball joints which are actuated by jacks arranged along said elements. These jacks present lateral protuberances along the arm elements which considerably increase the cross-section of the arm. In addition, because of the relatively limited travel distance of the rod of said jacks, the angular displacement of the elements with respect to one another is rather restricted.

Furthermore, this type of apparatus uses as fluids (water, oil) for the operation of the jacks, which on the one hand may be dangerous when used in nuclear reactors, and on the other hand, necessitate the use of a large number of ducts each associated with a given jack.

Another type of manipulator using mechanical gearing control is described in French Pat. No. 1,459,250. In this apparatus, the rotational axes of the gears are at right angles to the longitudinal axis of the element which houses them and since the pinions necessarily have a large diameter in order to be able to transmit relatively high torque, the diameter and length of the arm are large. In addition, the disclosed arrangement of the gear wheels does not fully lend itself to sound sealing, with the result that the manipulator cannot operate in a liquid, such as under water in the passages of nuclear reactors.

Finally as regards the terminal tool of a manipulator, French Pat. No. 1,508,128 describes an example of a known one including three electric motors housed in an arm element used to axially displace, to rotate and to open or close the gripping members of a pair of tongs.

This assembly though compact, is very complex and has the major drawback of requiring of electric supply rings on which collector strips rub.

It is an object of the invention to provide a telemanipulator which overcomes the abovementioned drawbacks.

It is another object of the invention to provide a compact telemanipulator with a large number of instruments confined in a restricted space.

It is a further object to provide a telemanipulator which is capable of carrying out the same movements as a human arm while minimizing bulk, thus enabling it to penetrate into very narrow passages.

Yet another object of the invention is to provide a telemanipulator in which the combination of a choice and arrangement of arm element and tool drive means produces a telemanipulator which is compact, accurate, powerful for its size and particularly effective for operation in restricted spaces.

Other objects and advantages of the invention will become apparent from the description which follows.

GENERAL DESCRIPTION OF THE INVENTION

According to the invention there is provided a telemanipulator capable of penetrating inside narrow passages, consisting of an arm comprising elongated elements articulated together, means housed in each element and associated with each articulation to actuate the bending of adjacent arm elements, orientable gripping members mounted at the tip of the element at the end of the arm, and means for driving said gripping members housed in said end element, the means for actuating the bending of each articulation between two consecutive elements including an electric motor oriented with its drive shaft along the longitudinal axis of the element, a device for transforming the rotary movement of the motor into a translation movement along the axis of the element which contains said means, and a transmission mechanism for the bending forces between said device and the other adjacent element.

BRIEF DESCRIPTION OF THE DRAWINGS

The invention will now be described in more detail referring to a particular embodiment given purely by way of non-limiting example and illustrated in the accompanying drawings.

FIG. 3 shows a section of an end element of said embodiment.

DESCRIPTION OF A PREFERRED EMBODIMENT

Figure 1:
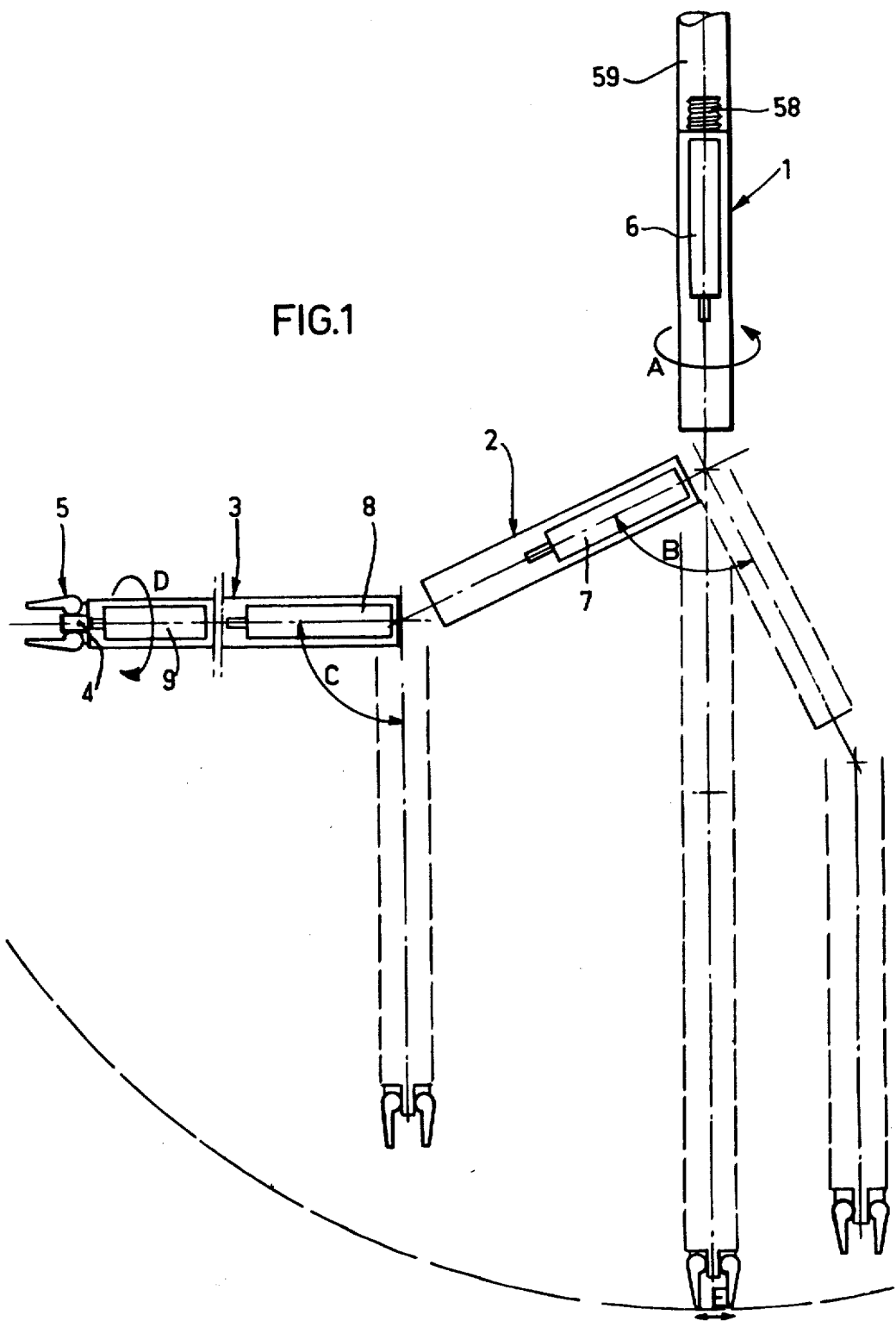
FIG. 1 shows a diagram of a telemanipulator arm assembly with three arm elements, according to the invention.

The telemanipulator according to the invention (FIG. 1) includes an arm formed of several elongated elements articulated together, such as a support tube 1, an intermediate element 2 and an end element 3 comprising a terminal tool 4 provided with clamping pliers (or collet), the manipulator being able to effect an orienting movement A by pivoting around the longitudinal axis of the support tube 1, changes in direction B and C with respect to said axis by flexion of the articulated elements, a pivoting movement D of the terminal tool 4 around the axis of the end element 3 and an opening and closing movement E of the arms of the pliers 5.

The various articulated elements are tubular and the means enabling the aforesaid movements to be actuated are located inside these elements. Elements 1 and 2 house drive motors 6 and 7 respectively which ensure their flexion. The end element 3 houses the motors 8 and 9 which serve for actuating and for orienting the pliers 4 respectively. All the motors 6, 7, 8 and 9 are preferably electric brake motors. This type of motor permits remote activation by means having leads of small cross-section and possesses stopping and position-holding characteristics superior to those of hydraulic or pneumatic motors. In addition, to further reduce the needed number of supply leads, permanent magnet DC motors having brakes actuated upon de-energizing the motor which only require two leads are preferably used.

Figure 2:
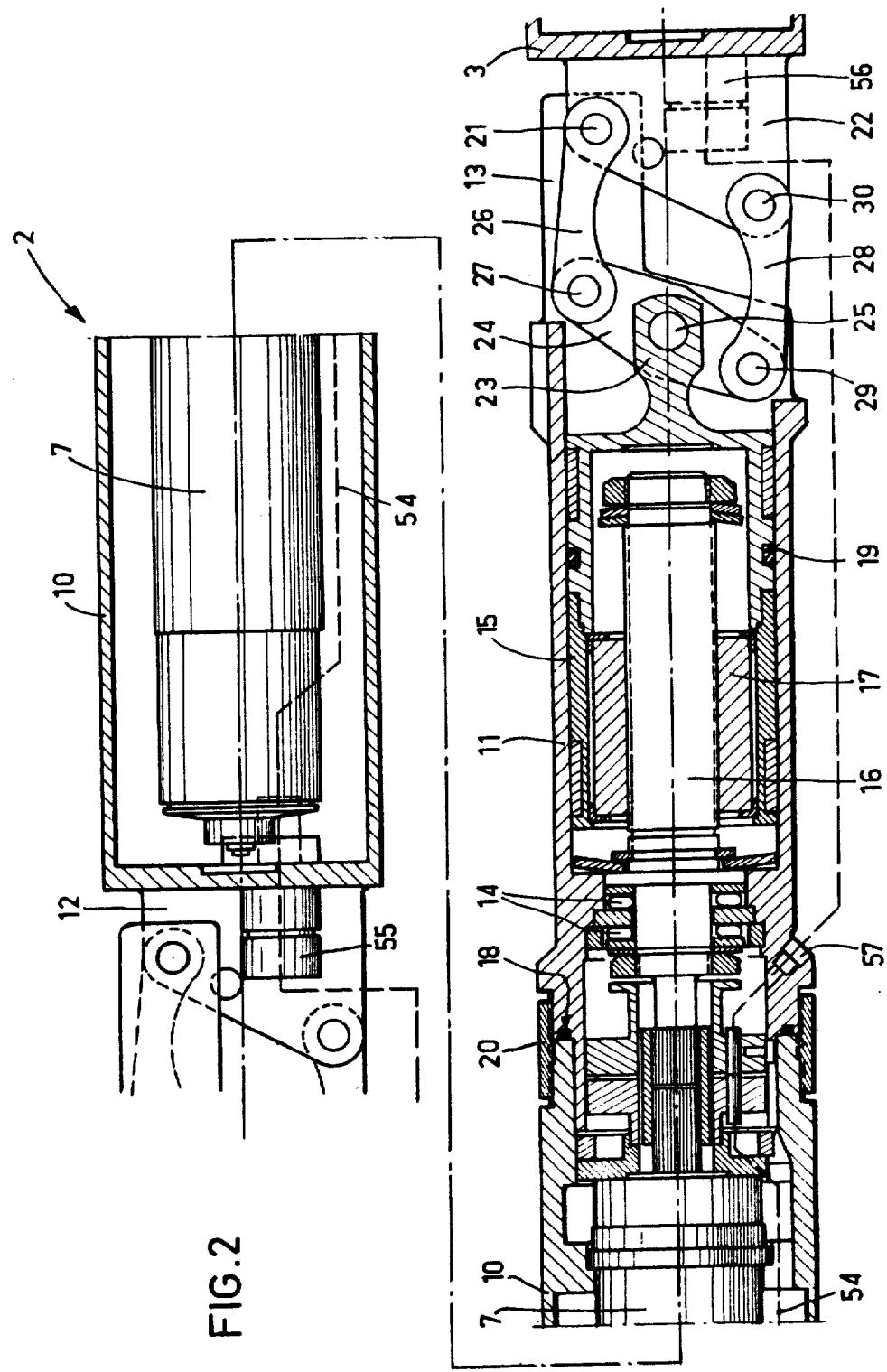
FIG. 2 shows a section of an intermediate element of the embodiment shown in FIG. 1.

As shown in FIG. 2, the intermediate element 2 of the manipulator comprises a tubular body in two parts 10 and 11. The rear part 10 is provided with a block 12 articulated with the support tube 1 and housing the electric brake motor 7. The front part 11, centered on the rear part 10, is provided with a fork 13 articulated with the end element 3 and houses a screw-nut system which transforms the rotary movement of the motor shaft 7 into a movement of translation transmitted to a hollow slider 15. The screw 16 of the screw-nut system is mounted on bearings 14 in the tubular part 11. The end of the motor shaft 7 is connected in rotation with said screw 16, as for example, by means of grooves. The nut 17 of the system is fixed inside the slider 15 movable in translation along the axis of the body of the element 2, into the front part 11 of the latter.

The front and rear parts of the body of the element are coupled by a threaded sleeve 20 and a toric seal 18 is provided at the junction between said parts. In the same way, a toric seal 19 is provided at the periphery of the slider 15. The seals 18 and 19 are designed to provide fluid-tightness and to prevent infiltrations during operations carried out in water. The fork 13 of the front part 11 possesses arms parallel to the axis of the element 2 but offset laterally with respect to the latter and said fork is articulated around an axle 21 on a yoke 22 borne by the rear of the end element 3, the articulation axle 21 being at right angles to the longitudinal axes of the elements 2 and 3 and offset laterally with respect to said axes.

The bending of the arm at the point of articulation between the elements 2 and 3 is actuated by the sliding of the slider 15 whose tip 23 is coupled to the yoke 22 of the element 3 by a mechanism for transmitting thrust and traction forces. This mechanism comprises a lever 24 pivoted at its middle around an axle 25 on the tip 23 of the slider, a rod 26 articulated on the one hand around the axle 21 borne by the fork 13 and on the other hand around the axle 27 borne by one end of the lever 24 and a rod 28 articulated around axles 29 and 30 borne respectively by the other end of the lever 24 and by the yoke 22 of the element 3. Preferably, the distances between the axles 21, 27, 29 and 30 are selected substantially equal in pairs so that said axles occupy the tops of a deformable parallelogram whose sides are constituted by the lever 24, the two rods 26 and 28 and the yoke 22.

The end element 3 shown in FIG. 3 includes a body in two parts 31 and 32 coupled by a threaded sleeve 33 similar to the sleeve 20 used for the intermediate element 2 described above. The rear part 31 of the element 3 as well as the motor 8 contained in the latter are preferably identical and interchangeable with the rear part 10 of the element 2 and the brake motor 7 that it contains, the screw 34–nut 35 system being similar to the screw 16–nut 17 system of the intermediate element 2 and connected in identical manner to the drive motor 8.

On the other hand, the front part 32 of the element 3 is more elongated than that of the element 2 and the slider 36, which is tubular and fastened to the nut 35, contains the brake motor 9 serving to pivot the end tool 4 around the longitudinal axis of the element 3. The end tool 4 is composed of an orientable support 40 traversed by a central bore and of a keyed pin 41 sliding in said bore; the pin is provided at the end with a coupled rack 42. The support 40, which has the form of a plate extended by a cylindrical tail, bears on its plate arms 50 and 51 of the gripping pliers 5 which are arranged facing each side of the longitudinal axis of the element 3.

The arms 50 and 51 of the pliers are articulated symmetrically on the plate of the support 40 around axles 43 and 44 parallel to each other and at right angles to the axis of the element 3 and they each possess a heel which is a toothed sector, said sectors 52 and 53 respectively engaging symmetrically on the axial rack 42. The cylindrical tail of the support is mounted on bearings 37 inside a casing 38 fixed to the free end of the front part 32 of the element 3. The rear end of the pin 41 is connected in rotation with the shaft of the motor 9, as for example by means of grooves, and held by bearings 39 mounted in the front part of the slider 36, said bearings rendering the pin fast to the slider in its axial translation movement.

The rotation of the pin 41 driven by the motor 9 is transmitted to the support 40 through a key 45 fixed to said pin and engaged in a groove 46 formed in the bore of said support. This groove is provided much longer then the key to enable the axial sliding of the pin. Toric seals 47, 48 and 49 ensure the fluid-tightness respectively between the static casing 38 and the tubular body of the element 3, between the rotary support 40 and the casing 38 and between the sliding pin 41 and the support 40.

In FIGS. 2 and 3, the electrical leads supplying the motors 7, 8 and 9 are shown diagrammatically by a dashed line 54, said leads penetrating into the tubular bodies of the elements 2 and 3 through rear connectors 55 and 56 and emerging substantially at the middle of the elements 1 and 2 through packing glands 57, the cables passing from the element between the packing gland and the rear connector of the following element.

The support tube 1 is preferably identical to the intermediate element 2 with the exception of its rear end which does not include a yoke but which has, for example, a threaded tip 58 (FIG. 1). This tip is screwed into a tubular extension 59 to enable the articulated arm of the manipulator to be inserted deep inside the passages of a reactor.

The telemanipulator according to the invention operates in the following manner.

The orienting motion A is obtained by manually rotating the support tube 1 or its extension 59 around its axis. The bending B or C at the level of each articulation between two adjacent elements results from rotation of the shafts of the motors 6 or 7 which, through screw-nut systems, cause sliding of the slider in the body of the corresponding element. For example, at the level of the articulation between the elements 2 and 3, the translation of the tip 23 of the slider 15 results in the pivoting of the lever 24 around the axle 25 since the axle 27 is held at a constant distance from the axle 21 by the rod 26, and the result is a displacement forwards or backwards of the axle 29 which draws the axle 30 by means of the rod 28 and causes the yoke 22 and the element 3 to pivot around the fixed axle 21. By means of this articulated linking mechanism, the radial reactions on the tip of the slider are small, which considerably reduces wear between the slider 15 and part 11 of the body of the element and thus preserves good fluid-tightness, said mechanism enabling reduction of the travel of the slider and consequently the size in length of the apparatus.

The pivoting D of the end tool 4 for the orientation of the pliers 5 is actuated by the rotation of the shaft of the motor 9 which drives the orientable support 40 through the pin 41 and its key 45. The actuation E of the arms of said pliers arises from the rotation of the shaft of the motor 8 which moves the slider 36 axially through the screw 34–nut 35 system. This slider moves the motor 9 and the pin 41 whose rack causes the tooth sectors 52, 53 to pivot thus actuating the arms 50 and 51 of the pliers.

Of course, the scope of the invention is in no way limited to the single particular embodiment described above by way of non-limiting example, but it also covers any modification which differs only in detail.

I claim:

1. A telemanipulator arm element for mounting a gripping tool having gripping members, said element comprising an elongated body member; means to mount the tool adjacent to an end of the body member for rotation of the tool about the longitudinal axis of the body member; means to operate the gripping mechanism of the tool, including a first motor having a housing and a rotative drive shaft mounted within the body member, with said first motor housing secured against rotation with respect to the body member and said first motor drive shaft extending in substantial alignment with the longitudinal axis of the body member, and further including a slider and mechanical converting means for converting the rotation of the first motor drive shaft into linear movement of the slider in a direction generally parallel to the longitudinal axis of the body member and means for converting the slider movement into movement of said gripping members toward and away from one another; means to rotate the tool about the longitudinal axis of the body member, including a second motor having a housing and a rotative drive shaft mounted within the body member intermediate the first motor and the tool, with said second motor housing secured against rotation with respect to the body member and said second motor drive shaft extending in substantial alignment with the longitudinal axis of the body member; and nonrotative transmission line means for supplying driving power from an external source to said first and second motors.

2. The element of claim 1, wherein said means for converting the rotation of the first motor drive shaft into linear movement of the slider comprises a screw-nut system.

3. The element of claim 1, wherein said first and second motors are permanent magnet DC electric brake motors.

4. The element of claim 1, wherein said second motor is mounted on said slider for linear movement therewith.

5. The element of claim 4, wherein said means to rotate the tool includes a tool support mounted axially of said body member for rotation with respect thereto, said tool support having a central bore with a longitudinal groove therein, a pin extending through said bore and mounted on said second motor drive shaft for rotational and lineal movement therewith, and a key located on the periphery of said pin and extending into said groove for travel therealong, and wherein said means for converting slider movement into relative movement of said gripping members comprises means for converting linear movement of said pin into relative movement of said gripping members, whereby rotational movement of the pin produces rotation of said tool support and whereby linear movement of said pin produces movement of said gripping members toward and away from one another.

6. In a combination with the arm element of claim 1, a second elongated arm element; a joint including mechanical linkage means pivotally connecting said second elongated arm element in end-to-end, series relationship with said first-named arm element for relative bending about said joint; and bending mechanism comprising a third motor housed within one of said first-named and said second elements, said third motor having a rotative drive shaft extending in substantial alignment with the longitudinal axis of said one of said first-named and said second elements, a second slider coupled to said linkage means for reciprocal movement with respect to said one of said first-named and said second elements, and mechanical converting means for converting the rotation of the third motor drive shaft into linear movement of the second slider in a direction generally parallel to the longitudinal axis of said one of said first-named and said second elements, whereby linear movement of said second slider produces relative bending of said first-named and said second elements about said joint.

7. The combination of claim 6, wherein said first, second and third motors are permanent magnet DC electric brake motors.

8. The combination of claim 6, wherein said mechanical converting means for converting the rotation of the third motor drive shaft into linear movement of the second slider comprises a screw-nut system.

9. The combination of claim 6, wherein said mechanical linkage means comprises a lever pivoted at its center to said second slider, a first rod pivoted at its one end to one end of the lever and at its other end to the pivotal axis of the joint, and a second rod pivoted at its one end to the other end of the lever and at its other end to the other one of said first-named and second elements that does not contain the third motor.

* * * * *